United States Patent
Gant et al.

(10) Patent No.: US 11,992,037 B2
(45) Date of Patent: May 28, 2024

(54) CULINARY INJECTION DELIVERY DEVICE

(71) Applicants: Nicole M. Gant, Corona, CA (US); Dwane C. Gant, Corona, CA (US)

(72) Inventors: Nicole M. Gant, Corona, CA (US); Dwane C. Gant, Corona, CA (US)

(*) Notice: Subject to any disclaimer, the term of this patent is extended or adjusted under 35 U.S.C. 154(b) by 1037 days.

(21) Appl. No.: 16/816,473

(22) Filed: Mar. 12, 2020

(65) Prior Publication Data
US 2020/0288767 A1 Sep. 17, 2020

Related U.S. Application Data

(60) Provisional application No. 62/818,974, filed on Mar. 15, 2019.

(51) Int. Cl.
*A23P 20/25* (2016.01)
*A21C 15/00* (2006.01)
*A47J 43/16* (2006.01)

(52) U.S. Cl.
CPC ........... *A23P 20/25* (2016.08); *A21C 15/007* (2013.01); *A47J 43/16* (2013.01)

(58) Field of Classification Search
CPC ......... A23P 20/25; A21C 15/007; A47J 43/16
USPC ........................................... 99/532
See application file for complete search history.

(56) References Cited

U.S. PATENT DOCUMENTS

| | | | | |
|---|---|---|---|---|
| 3,483,810 A * | 12/1969 | Peters | ............... | A23B 4/28 604/117 |
| 4,064,879 A * | 12/1977 | Leibinsohn | ........... | A61M 5/486 604/218 |
| 5,226,897 A * | 7/1993 | Nevens | ............... | A61M 5/31511 604/218 |
| 5,250,026 A * | 10/1993 | Ehrlich | ............. | A61M 37/0069 604/117 |
| 5,267,859 A * | 12/1993 | Discko, Jr. | ............... | A61C 5/62 433/90 |
| 6,439,112 B1 | 8/2002 | Pope | | |
| 6,840,161 B2 * | 1/2005 | Backus | ................... | A23L 13/42 426/282 |
| 7,066,908 B2 * | 6/2006 | Kuracina | ......... | A61B 5/150633 604/116 |
| 7,681,494 B2 * | 3/2010 | Backus | .................... | A47J 43/16 99/345 |
| 8,567,309 B2 * | 10/2013 | Hawker | .................. | A47J 43/00 99/554 |
| 9,522,237 B2 * | 12/2016 | Alheidt | .............. | A61M 5/31511 |
| 9,622,620 B2 * | 4/2017 | Silberberg | .............. | A47J 43/28 |
| 10,265,477 B2 * | 4/2019 | Schwab | ............ | A61M 5/31578 |
| 10,675,418 B2 * | 6/2020 | Gazeley | ............ | A61M 5/31515 |
| 10,850,042 B2 * | 12/2020 | Giraud | .................... | A61L 31/10 |

(Continued)

*Primary Examiner* — Omar Flores Sanchez
(74) *Attorney, Agent, or Firm* — Boudwin Intellectual Property Law, LLC; Daniel Boudwin

(57) ABSTRACT

A culinary injection delivery device including a cylindrical housing having an interior volume. The cylindrical housing is opened at both ends. The first opened end has a delivery nozzle attached thereto. The second opened end has a plunger located therein. The plunger is made up of a stick and at least two disks. A first disk located on an end of the stick and a second disk located slightly aft of the first disk. A spring located be the first and second disk is configured to push the first disk forward. The first disk has an extension placed thereon that matches the interior of the delivery nozzle. The spring will push the first disk forward releasing a food product.

17 Claims, 4 Drawing Sheets

(56) References Cited

U.S. PATENT DOCUMENTS

| | | | |
|---|---|---|---|
| 11,285,301 B2* | 3/2022 | Ornelas Vargas | ............................ A61M 25/09041 |
| 2002/0195003 A1* | 12/2002 | Backus | ................... A23L 13/72 99/532 |
| 2004/0109924 A1* | 6/2004 | Brient | ..................... A23P 20/20 426/282 |
| 2011/0129574 A1 | 6/2011 | Pathak et al. | |
| 2011/0297014 A1 | 12/2011 | Patel | |
| 2012/0210885 A1 | 8/2012 | Kay et al. | |

* cited by examiner

CULINARY INJECTION DELIVERY DEVICE

CROSS REFERENCE TO RELATED APPLICATIONS

This application claims the benefit of U.S. Provisional Application No. 62/818,974 filed on Mar. 15, 2019. The above identified patent application is herein incorporated by reference in its entirety to provide continuity of disclosure.

BACKGROUND OF THE INVENTION

The present invention relates to injecting foods in the culinary arts. More particularly, the present invention provides an injector that will allow a person to inject an adjustable amount of material into a food product. The food product is not limited to solid foods the food item may be a beverage, frozen treat or a baked good.

Injecting food is a common culinary practice. Various pastries have jellies or cream injected into them after they have been cooked. Sometimes, various candies and popsicles also have items injected. It has also become a common practice to inject foods with organic oils and herbal remedies. These injections if done too early will ruin the food item or the injected material.

It is common that the temperatures of the injected substances need to be higher or lower than that of the food item. This can cause an issue as traditional injectors may not have the ability to maintain heat or cold. Further, when creating a cold food, it can be extremely difficult to inject a food item into the frozen food.

Consequently, there is a need in for an improvement in the art of food injecting. The present invention substantially diverges in design elements from the known art while at the same time solves a problem many people face when wanting to inject secondary foods into their premade foods or drinks. In this regard the present invention substantially fulfills these needs.

SUMMARY OF THE INVENTION

The present invention provides a culinary injection delivery device wherein the same can be utilized for providing convenience for the user when using a food injector after a food item has been prepared. The culinary injection delivery device is comprised of a cylindrical housing which has an interior volume. The cylindrical housing has an open first end and an open second end. A delivery nozzle is connected to the open first end. A plunger is movably placed within the second opened end of the cylindrical body. The plunger is comprised of a stick and at least two disks located at one end of the stick.

Another object of the culinary injection delivery device is to have a sealing ring placed around at least one of the at least two disks.

Another object of the culinary injection delivery device is to have a first disk of the at least two disks is located on an end of the stick and one disk is located slightly aft of the first disk.

Another object of the culinary injection delivery device is to have a conical shape attached to a front end of the first disk.

Another object of the culinary injection delivery device is to have the delivery nozzle be conical shaped.

Another object of the culinary injection delivery device is to have the delivery nozzle be removable.

Another object of the culinary injection delivery device is to have the cylindrical housing be threaded on the interior. Further, the plunger is threaded to the threading located on the interior of the cylindrical housing.

Another object of the culinary injection delivery device is to have the threading run the length of the interior of the cylindrical housing.

Another object of the culinary injection delivery device is to have the at least two disks configured to have threading located about the exterior of the disks.

Another object of the culinary injection delivery device is to have the push stick be comprised of a stick and a first disk attached to one end. A second disk is movably placed about the push stick. A spring is placed between the first disk and the second disk, wherein the spring is configured to push the first disk away from the second disk.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
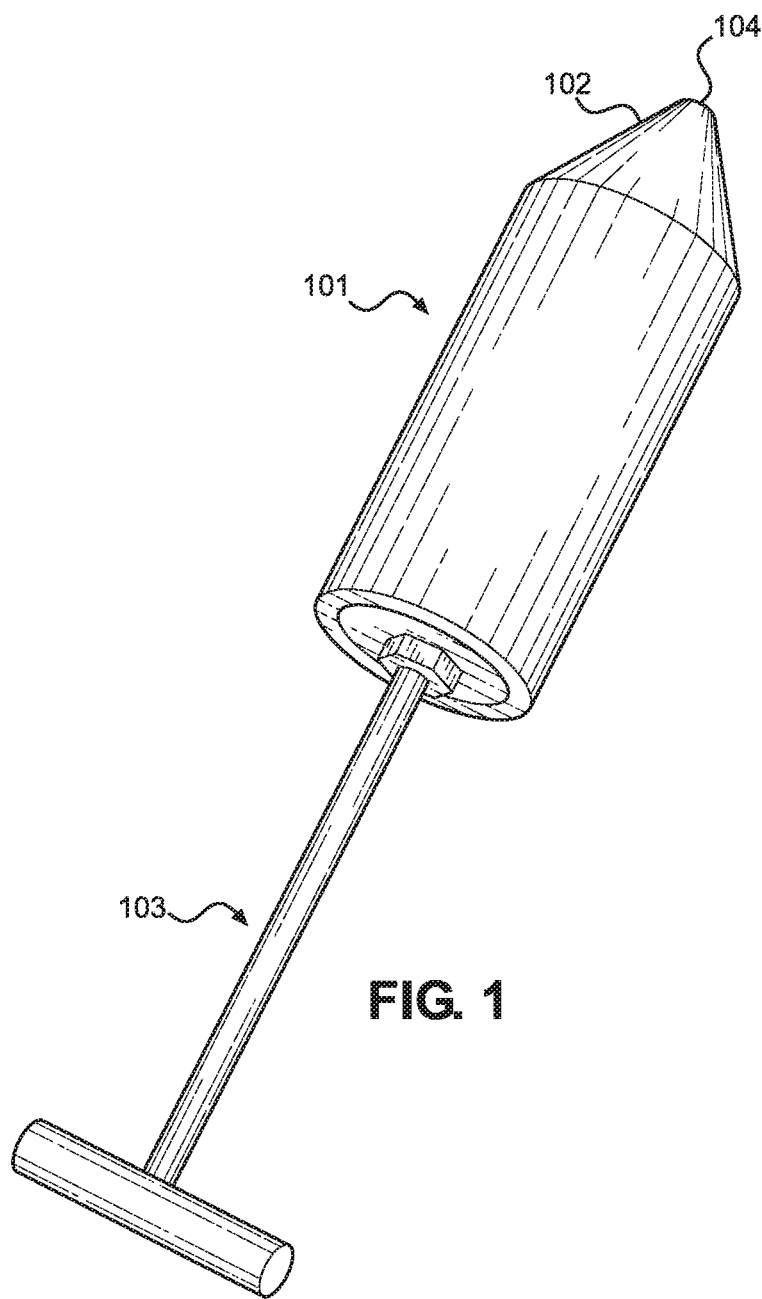
FIG. 1 shows a perspective view of an embodiment of the culinary injection delivery device.

Reference is made herein to the attached drawings. Like reference numerals are used throughout the drawings to depict like or similar elements of the culinary injection delivery device. For the purposes of presenting a brief and clear description of the present invention, a preferred embodiment will be discussed as used for the culinary injection delivery device. The figures are intended for representative purposes only and should not be considered to be limiting in any respect.

Referring now to FIG. 1, there is shown a perspective view of an embodiment of the culinary injection delivery device. The culinary injection delivery device is comprised of a housing 101 having an opening at both ends. In one embodiment the housing 101 is a tubular housing. The housing 101 should be made from a resilient material. This means that the housing 101 is able to withstand cold and warm temperatures. This will allow the housing 101 to be placed in a heating device or cooling device. In one embodiment the housing 101 is made from plastic.

The culinary injection delivery device further includes a dispensing nozzle 102. The dispensing nozzle 102 is configured to connect to the housing 101. In one embodiment the dispensing nozzle 102 is removably connected to the housing 101. The dispensing nozzle 102 tapers to a narrow point. The taper starts at the connection to the housing 101 and narrows toward the opposite end. The narrow end of the dispensing nozzle 102 has an aperture 104 located therethrough. This will allow a material to be dispensed from the housing 101 through the aperture 104 of the dispensing nozzle 102 and out of the device.

The dispensing nozzle 102 should also be made from a resilient material. This means that the dispensing nozzle 102 is able to withstand cold and warm temperatures. This will allow the dispensing nozzle 102 to be placed in a heating device or cooling device. In one embodiment the dispensing nozzle 102 is made from plastic. In another embodiment the dispensing nozzle 102 is made from a metal. In some embodiments the housing 101 and the dispensing nozzle 102 are made from different materials. These different materials may allow for a better heating or cooling process depending on the use of the device.

The culinary injection delivery device further includes a push stick 103. The push stick 103 is configured to be placed within the housing 101. The push stick 103 should also be made from a resilient material. This means that the push stick 103 is able to withstand cold and warm temperatures. This will allow the push stick 103 to be placed in a microwave or in a freezer. In one embodiment the push stick 103 is made from plastic. In another embodiment the push stick 103 is made from a metal. In some embodiments the housing 101, the dispensing nozzle 102, and the push stick 103 are made from different materials. The push stick 103 will be further detailed below in the descriptions of FIG. 2 and FIG. 3.

Figure 2:
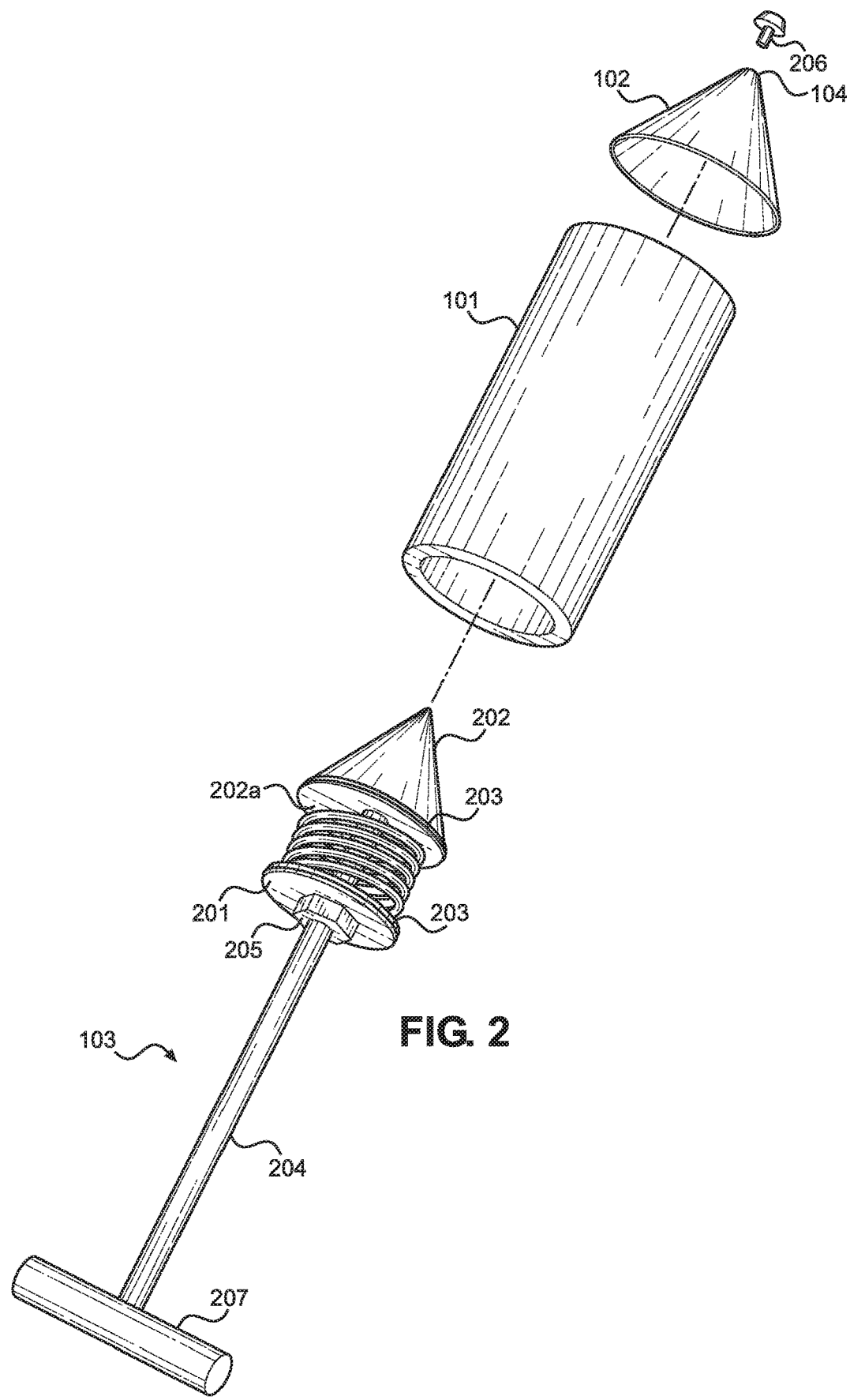
FIG. 2 shows an exploded view of an embodiment of the culinary injection delivery device.

Referring now to FIG. 2, there is shown an exploded view of an embodiment of the culinary injection delivery device. The push stick 103 is comprised of a stick member 204. In the shown embodiment the stick member 204 has a grasping member 207 attached thereto. In the shown embodiment the grasping member 207 is a perpendicular stick. In one embodiment the grasping member 207 is a cylinder.

The stick member 204 is attached at one end to a material pressing member 202. The material pressing member 202 is configured to fit within the housing 101. In one embodiment the material pressing member is comprised of a disk 202*a* with a conical shape attached. In one embodiment the material pressing member 202 will have an O-ring 203 placed around the member. This will create a seal when the material pressing member 202 is placed within the housing 101. In one embodiment the material pressing member 202 is shaped similar to the dispensing nozzle 102. This will allow the material pressing member 202 to fit within the dispensing nozzle 102 and leave very little material behind once used.

In one embodiment the push stick 103 further includes a disk member 201. The disk member 201 is placed along the stick member 204. In one embodiment the disk member 201 is placed behind the material pressing member 202 close to an end of the stick member 204. The disk member 201 is configured to fit within the housing 101. The disk member 201 will prevent the push stick 103 from becoming angled and ineffective during use. In one embodiment the disk member 201 has a brace 205 placed against it. The brace 205 will add extra support to the disk member 201. In a further embodiment an O-ring 203 will be placed around the disk member 201.

In some embodiments the culinary injection delivery device includes a sealing tip 206. The sealing tip 206 is configured to fit within the aperture 104 of the dispensing nozzle 102. The sealing tip 206 is further configured to prevent a food item from leaving the aperture 104 until desired. In one embodiment the sealing tip 206 is made from rubber. In another embodiment the sealing tip 206 is made from an edible substance.

Figure 3:
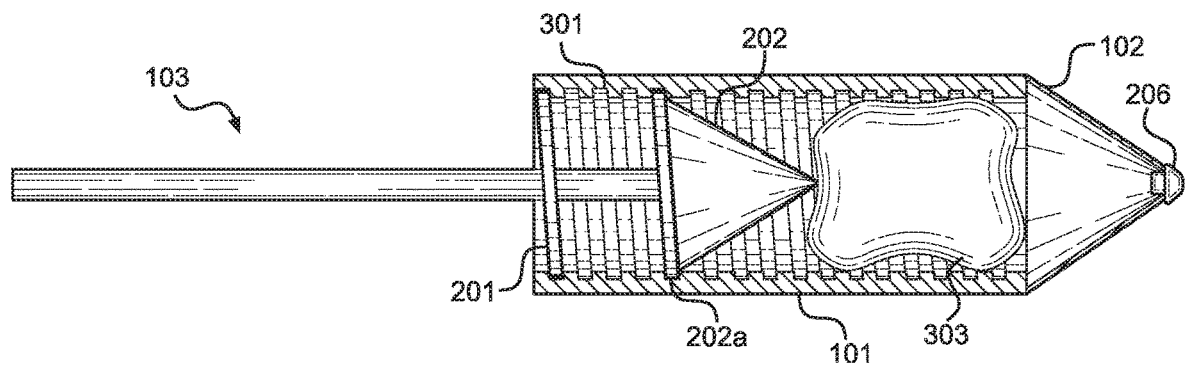
FIG. 3 shows a cross-sectional view of an embodiment of the culinary injection delivery device.

Referring now to FIG. 3, there is shown a cross-sectional view of an embodiment of the culinary injection delivery device. In one embodiment the housing 101 has a threading 301 located within. In one embodiment the material pushing member 202 is configured to secure to the threading 301. This will create a seal similar to that of an O-ring. In a further embodiment the disk member 201 is also configured to secure to the threading 301. In use an individual will turn the push stick 103 in order to force a material from the device.

In some embodiments the material pushing member 202 is further configured to have a puncturing shape. This will allow the culinary injection delivery device to house a package 303 of material to be dispensed. When a user is ready to inject the material, the material pushing member 202 will puncture the package 303. This will release the enclosed material for dispensing. The sealing tip 206 is shown placed within the dispensing nozzle 102. The sealing tip 206 will prevent any unwanted early release of the food to be injected.

Figure 4:
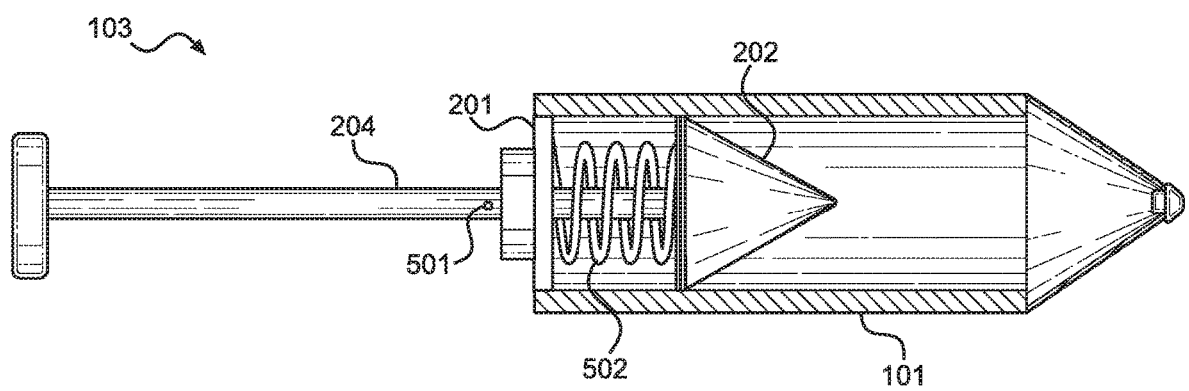
FIG. 4 shows a cross-sectional view of an embodiment of the culinary injection device with a spring release.

Referring now to FIG. 4, there is shown a cross-sectional view of an embodiment of the culinary injection device with a spring release. In the shown embodiment the pushing member attached to one end of the stick 204 is moved via a spring 502. The spring is positioned about the stick 204 between the first disk 202*a* attached to the push member 202 and the disk member 201. In this embodiment the disk member is moveably located around the stick 204. This will allow the push stick to move through the disk member 201 without the disk member 201 moving.

The spring 502 is configured to push the pushing member 202 forward into the housing 101. This will force a food material from the housing 101. In some embodiments the push stick 103 is drawn back and released to inject a food material. In other embodiments the push stick 103 is locked in place and released when desired. In the shown embodiment the is accomplished using a ball detent 501. The ball detent 501 is located within the stick 204. The ball detent 501 is configured to engage with the disk member 201 holding the push stick 103 in place. In other embodiments the stick 103 has an aperture therethrough. In this embodiment a pin is inserted into the aperture to hold the push stick 103 in place.

Figure 5:
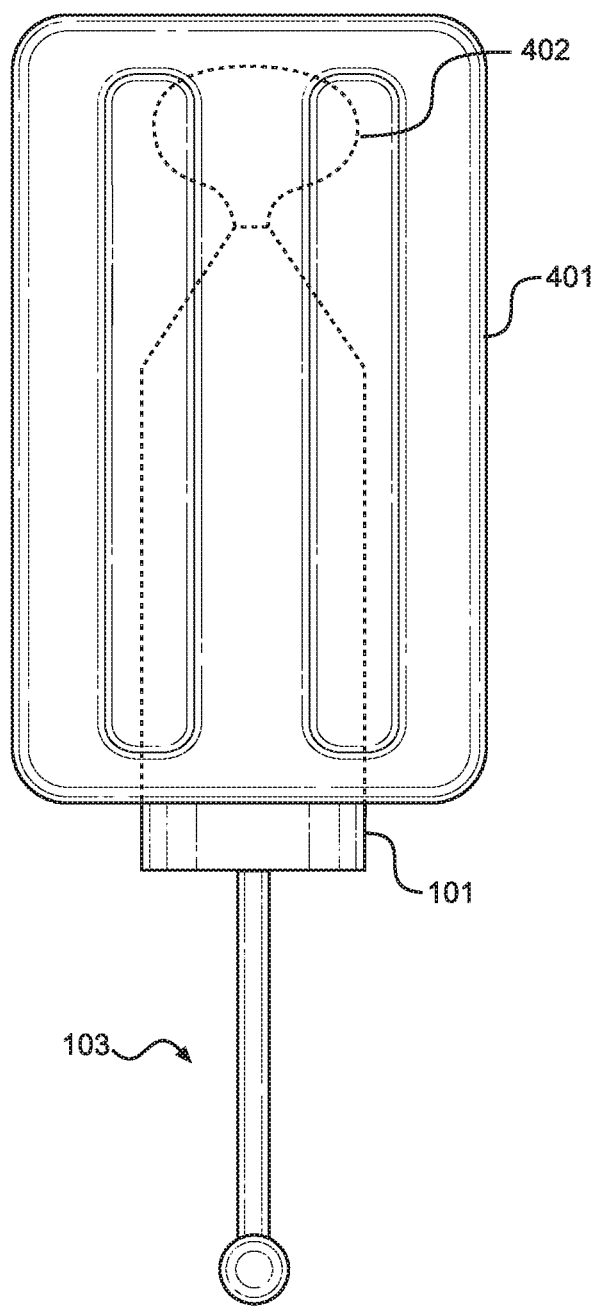
FIG. 5 shows an in-use view of an embodiment of the culinary injection delivery device.

Referring now to FIG. 5, there is shown an in-use view of an embodiment of the culinary injection delivery device. In use the housing 101 of the culinary injection delivery device is placed within a food 401 and a material 402 is injected using the push stick 103. In the shown embodiment the food item 401 is a popsicle. Other food items may also be positioned around the housing 101 in the same manner.

Using this device, however, presents further options. In one embodiment the material to be injected 402 can first be cooled. In another embodiment the material to be injected 402 can first be heated. In some embodiments the culinary injection delivery device has a food item prepared for service with the device inside of the food item. In one embodiment a popsicle or similar frozen treat is frozen around the device. In this way a user can wait to inject a material 402 until the food item is ready to be eaten. This allows a user to inject food items as eaten keeping them fresher until ready to be consumed.

In all embodiments the culinary injection delivery device should be made from food safe materials. In one embodiment the material is a biodegradable material. In the embodiments where the material is biodegradable it should still hold up when liquids are placed therein. This means that the degradation should not immediately take place. In another embodiment the material is dishwasher safe.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A culinary injection delivery device, comprising:
   a cylindrical housing having an interior volume, the cylindrical housing has an open first end and an open second end;
   a delivery nozzle connected to the open first end; and
   a push stick movably placed within the open second end of the cylindrical housing, the push stick is comprised of a stick and at least two disks located at one end of the push stick; and
   a food capsule placed within the cylindrical housing.

2. The culinary injection delivery device of claim 1, further comprising a sealing ring placed around at least one of the at least two disks.

3. The culinary injection delivery device of claim 1, wherein a first disk of the at least two disks is located on the end of the stick and one disk is located slightly aft of the first disk.

4. The culinary injection delivery device of claim 3, further comprising a conical shape attached to a front end of the first disk.

5. The culinary injection delivery device of claim 1, wherein the delivery nozzle is conical shaped.

6. The culinary injection delivery device of claim 1, wherein the delivery nozzle is removable.

7. A culinary injection delivery device, comprising:
   a cylindrical housing having an interior volume, the cylindrical housing has an open first end and an open second end;
   wherein the cylindrical housing has a threading located on an inside thereof;
   a delivery nozzle connected to the open first end;
   a push stick threaded to the threading located on the inside of the cylindrical housing, the push stick is comprised of a stick and at least two disks located at one end of the stick; and
   wherein the threading runs an entire length of the interior volume of the cylindrical housing.

8. The culinary injection delivery device of claim 7, wherein a first disk of the at least two disks is located on the end of the stick and one disk is located slightly aft of the first disk.

9. The culinary injection delivery device of claim 8, further comprising a conical shape attached to a front end of the first disk.

10. The culinary injection delivery device of claim 7, wherein the delivery nozzle is conical shaped.

11. The culinary injection delivery device of claim 7, wherein the delivery nozzle is removable.

12. The culinary injection delivery device of claim 7, wherein the at least two disks are configured to have threading located about an exterior of the at least two disks.

13. A culinary injection delivery device, comprising:
    a cylindrical housing having an interior volume, the cylindrical housing has an open first end and an open second end;
    a delivery nozzle connected to the open first end;
    a push stick movably placed within the open second end of the cylindrical housing;
    wherein the push stick is comprised of a stick and a first disk attached to one end;
    a second disk movably placed about the push stick;
    a spring placed between the first disk and the second disk, the spring is configured to push the first disk away from the second disk; and
    a ball detent located within the push stick, the ball detent will hold the push stick in place when engaged with the second disk.

14. The culinary injection delivery device of claim 13, further comprising a conical shape attached to a front end of the first disk.

15. The culinary injection delivery device of claim 13, wherein the delivery nozzle is conical shaped.

16. The culinary injection delivery device of claim 13, further comprising a sealing tip located within the delivery nozzle.

17. The culinary injection delivery device of claim 13, further comprising a grasping member attached to the push stick at the end opposite the first disk.

* * * * *